US010812466B2

(12) United States Patent
Singh et al.

(10) Patent No.: US 10,812,466 B2
(45) Date of Patent: Oct. 20, 2020

(54) USING TRUSTED PLATFORM MODULE TO BUILD REAL TIME INDICATORS OF ATTACK INFORMATION

(71) Applicant: McAfee, LLC, San Jose, CA (US)

(72) Inventors: Balbir Singh, Gurgaon (IN); Preet Mohinder, New Delhi (IN); Manish Sharma, Gurgaon (IN); Rahul Chandra Khali, Gurgaon (IN)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 14/704,510

(22) Filed: May 5, 2015

(65) Prior Publication Data

US 2016/0330193 A1 Nov. 10, 2016

(51) Int. Cl.
*G06F 11/00* (2006.01)
*H04L 29/06* (2006.01)

(52) U.S. Cl.
CPC ........ *H04L 63/0823* (2013.01); *H04L 63/145* (2013.01); *H04L 63/1416* (2013.01); *H04L 2463/146* (2013.01)

(58) Field of Classification Search
CPC ............. H04L 63/1416; H04L 63/1408; H04L 9/3281; H04N 21/8358
See application file for complete search history.

(56) References Cited

U.S. PATENT DOCUMENTS

| 7,096,497 | B2 | 8/2006 | Ellison et al. | |
|---|---|---|---|---|
| 8,176,556 | B1* | 5/2012 | Farrokh | H04L 63/1483 713/188 |
| 9,294,468 | B1* | 3/2016 | Kilbourn | H04L 63/0823 |
| 2005/0228999 | A1 | 10/2005 | Jerdonek et al. | |
| 2006/0070130 | A1 | 3/2006 | Costea et al. | |
| 2007/0074019 | A1* | 3/2007 | Seidel | H04L 63/0823 713/156 |
| 2007/0260738 | A1 | 11/2007 | Palekar et al. | |
| 2008/0082662 | A1* | 4/2008 | Dandliker | H04L 63/10 709/225 |

(Continued)

OTHER PUBLICATIONS

International Search Report and the Written Opinion of the International Searching Authority, dated Jul. 5, 2016, 16 pages.

(Continued)

*Primary Examiner* — Fatoumata Traore
*Assistant Examiner* — Carlton Johnson
(74) *Attorney, Agent, or Firm* — Hanley, Flight and Zimmerman, LLC

(57) ABSTRACT

Managed devices containing a Trusted Platform Module (TPM) to provide a trusted environment generate a device certificate at initialization of the TPM and send the device certificate to a management console for storing in a certificate database. Upon detecting a file of interest, the TPM signs the file, adding to a signature list created by previous managed devices. The signature list can be used to analyze the spread of the file across the system of managed devices, including tracking the file to the first managed device to have had a copy, without requiring real-time access to the managed devices during the spread of the file. In some embodiments, additional security measures may be taken responsive to determining the first managed device and the path the file has taken across the system of managed devices.

25 Claims, 10 Drawing Sheets

(56) References Cited

U.S. PATENT DOCUMENTS

| | | | |
|---|---|---|---|
| 2008/0134309 A1* | 6/2008 | Qin | G06F 21/105 |
| | | | 726/6 |
| 2008/0155691 A1 | 6/2008 | Fossen et al. | |
| 2013/0298244 A1 | 11/2013 | Kumar et al. | |
| 2014/0032913 A1* | 1/2014 | Tenenboym | H04L 9/321 |
| | | | 713/176 |

OTHER PUBLICATIONS

European Patent Office, "Search Report", issued in connection with EP application No. 16789723.0, dated Sep. 24, 2018, 10 pages.

\* cited by examiner

USING TRUSTED PLATFORM MODULE TO BUILD REAL TIME INDICATORS OF ATTACK INFORMATION

TECHNICAL FIELD

Embodiments described herein generally relate to data security and in particular to techniques for securely identifying files and their spread across an organization.

BACKGROUND ART

Enterprise system and security administrators are constantly dealing with threats to the systems under their control and taking actions to guard against threats and where necessary remove those threats and repair problems caused by them. One of the difficulties in such a task is in verifiably determining how a threat has spread from system to system in the enterprise, and determining a point of entry into the enterprise. Forensic evidence has been difficult to obtain. For example, users may deny that their system was used as a point of entry for an application that turns out to be malware, either from disbelief or an effort to avoid blame. A technique for helping administrator determine the source of an attack and its spread across the enterprise would be useful, particularly if the information obtainable by the administrator was strong enough to serve as forensic evidence.

DESCRIPTION OF EMBODIMENTS

Figure 1:
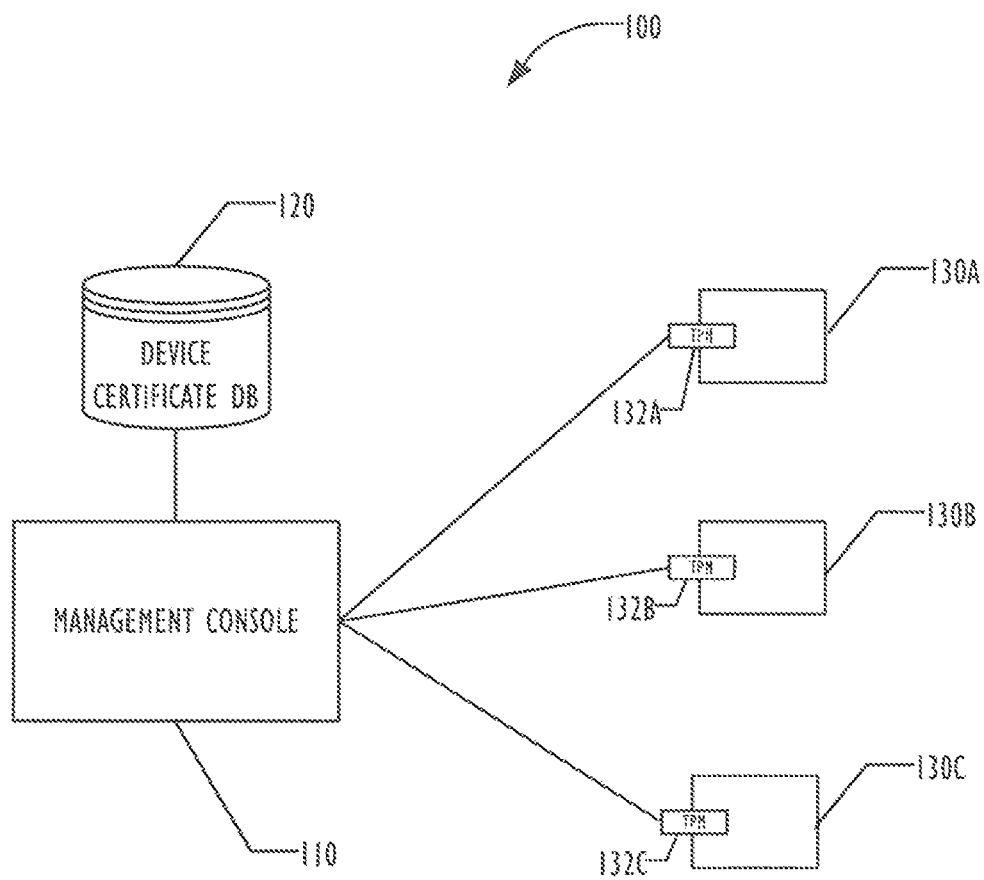
FIG. 1 is a block diagram illustrating a management console and a collection of managed devices according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

As used herein, a processor refers to a hardware processor that may be implemented as a multicore processor. In some embodiments, multiple processor elements may together function to provide processing capabilities for the device, and references to "a processor" may mean one or more of the processor elements, all or some of which may be implemented on a single chip. Similarly, a machine readable medium refers to one or more physical media that together should be considered a single medium, As used herein, the term "a programmable device" can refer to a single programmable device or a plurality of programmable devices working together to perform the function described as being performed on or by a programmable device. The programmable device can be any type of programmable device, including desktop computers, laptop computers, servers, and mobile devices, including devices containing embedded computational capability.

As used herein, "a trusted environment" is a segregated execution environment on the platform that is able to execute only trusted code. Often, a trusted environment can attest (or prove) that it is an instance of a trusted environment prior to having keys provisioned into the environment. Examples of trusted environments can be implemented on co-processors or secondary cores or as part of the platform architecture, such as with an attested virtual machine manager or trust-zone like capability. An "untrusted environment" is any environment not a trusted environment.

As used herein, a "signature list" or "signature chain" is a collection of certificated signatures of electronic data, each signature of which signs the electronic data and all previous signatures. To traverse the chain of signatures, the public key associated with each certificate may be used to unlock the signature, allowing access to the next signature in the chain. Any tampering with either the signature or the file may then be detected. Various implementation techniques may be used, and the use of the term "list" or "chain" does not imply any specific arrangement or format for the storage of the signatures.

Forensics and indicators of attack are technologies that are helping security admins identify threats and take action to remove them in real-time. A good solution allows the administrator to figure out where the attack originated from and in a way that is verifiable. While there are many techniques of building indicators of attack, embodiments of the techniques disclosed below use whitelists and Trusted Platform Modules (TPMs) to identify files uniquely and to identify their spread across the enterprise. The TPMs provide a trusted environment for the file identification and signing of files. The administrator has evidence and more information about the spread. This information can also be used as forensic evidence.

The basic principle is that in a whitelisting solution several important files are already signed (either embedded/ catalog or via extended attributes). We propose to use chained embedded signatures on files that are tracked as a part of the whitelist. The signature is created using a key unique to the system where the file is currently seen. This key is stored in the TPM. Using out of band management of systems or other technology a management console can be aware of all the client certificates (public keys) for each device. As a file spreads across devices, signatures are chained. When a file is discovered as malicious, the information can be looked up in the management console, which can then track the chain down and show the exact spread pattern of the file. If the certificate signature list is tampered or changed, signature verification on it will fail. In some embodiments, files that fail signature verification may be prohibited from execution and a management console may be notified of the failure. As described below, a single file can be signed with multiple unique certificates that identify each device that the file has been on, in addition to an originators signature.

Indicators of attacks may be tracked using various means such as a communications fabric that allows sharing data between security components, forensics software, global threat intelligence databases, and tracking Indicators of Compromise (IOCs). All of these track security information at various stages and share information to show end-to-end execution patterns. Our approach integrates with existing subsystems where we provide non tamper-able evidence of the way a file ((executable or otherwise) has spread across systems. Using our inventory we track every file (or files of interest), information about the file, and associated certificates. One certificate is present in the file for each device it has been on and certificates start chaining as the file is copied or reaches another system. We do not have to go back in time to look for the spread pattern, because the information is embedded in the file. This information can be used in real time to track affected hosts and take action. Integration with the TPM gives us the ability to implement the solution in a way that it is tamper-proof; thus, the information can thus be used as forensic evidence.

FIG. 1 is a block diagram illustrating a basic system 100 according to one embodiment where a management console 110 is set up to talk to several devices 130 (all TPM enabled). A unique certificate is generated per device and the keys are stored in TPM. The management console also pulls in inventory (a database of all application metadata, including their certificates) from across devices 130. Information about each device's TPM certificate (e.g., the public key corresponding to that certificate) is also fetched and stored. TPM gives us the capability to uniquely identify the device in a tamperproof way.

Management console 110 is a computer system that is connected to a device certificate database 120, which stores information about certificates obtained from client devices 130A-C in that are connected via one or more networks (not shown in FIG. 1) to the management console 110. Although only three client devices 130 are illustrated in FIG. 1, any number of client devices 130 may be deployed. Each of the client devices 130A-C includes a TPM 132A-C that provides a cryptographically secure environment. The TPMs 132A-C may create signing certificates for use in the signing techniques described below, storing information about the certificates in a protected storages area accessible only to the respective TPM 132A-C. The management console 110 may obtain certificate information from each TPM 132, including public key information associated with the certificate, and store the information in a device certificate database 120, which may be either local to management console 110 or remotely accessible by management console 110. The management console 110 and the managed devices 130 may be part of a common enterprise in some embodiments. In other embodiment, the management console 110 may be part of a different business entity or enterprise than some or all of the managed devices 130, such as when a third party provides management services for one or more unrelated entities.

Figure 2:
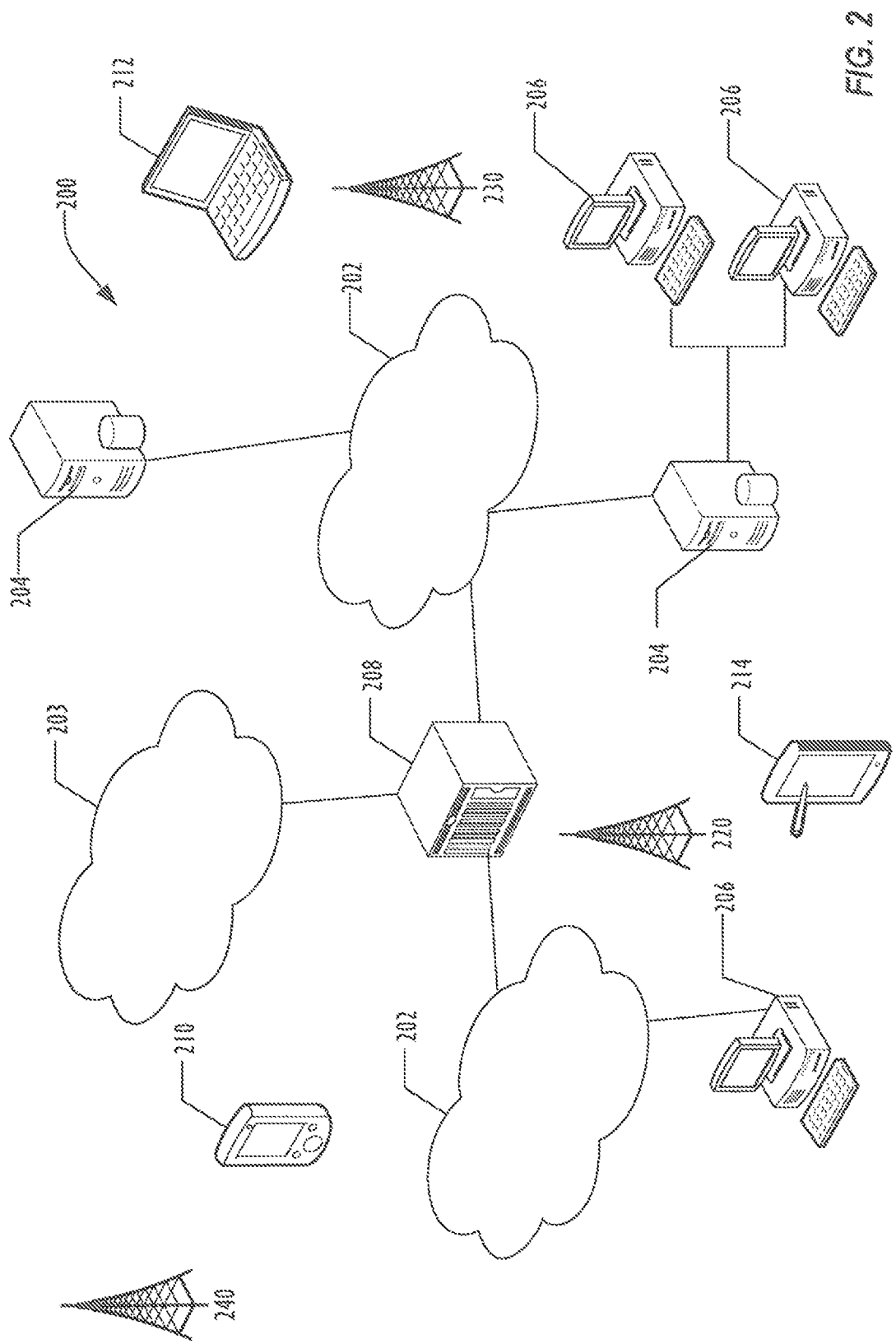
FIG. 2 is a block diagram illustrating an infrastructure in which techniques described below may be implemented according to one embodiment.

Referring now to FIG. 2, an example infrastructure 200 in which the techniques described below may be implemented is illustrated schematically. Infrastructure 200 contains computer networks 202. Computer networks 202 may include many different types of computer networks available today, such as the Internet, a corporate network, or a Local Area Network (LAN). Each of these networks can contain wired or wireless programmable devices and operate using any number of network protocols (e.g., TCP/IP). Networks 202 may be connected to gateways and routers (represented by 208), end user computers 206, and computer servers 204. Infrastructure 200 also includes cellular network 203 for use with mobile communication devices. Mobile cellular networks support mobile phones and many other types of devices. Mobile devices in the infrastructure 200 are illustrated as mobile phones 210, laptops 212, and tablets 214. A mobile device such as mobile phone 210 may interact with one or more mobile provider networks as the mobile device moves, typically interacting with a plurality of mobile network towers 220, 230, and 240 for connecting to the cellular network 203. Although referred to as a cellular network in FIG. 2, a mobile device may interact with towers of more than one provider network, as well as with multiple non-cellular devices such as wireless access points and routers 208. In addition, the mobile devices 210, 212, and 214 may interact with non-mobile devices such as computers 204 and 206 for desired services, which may include providing the application to user agent mapping and analysis services described above. The functionality of the management console 110 may be implemented in any device or combination of devices illustrated in FIG. 2; however, most commonly it is implemented in a server 204 or end user computer 206.

Figure 3:
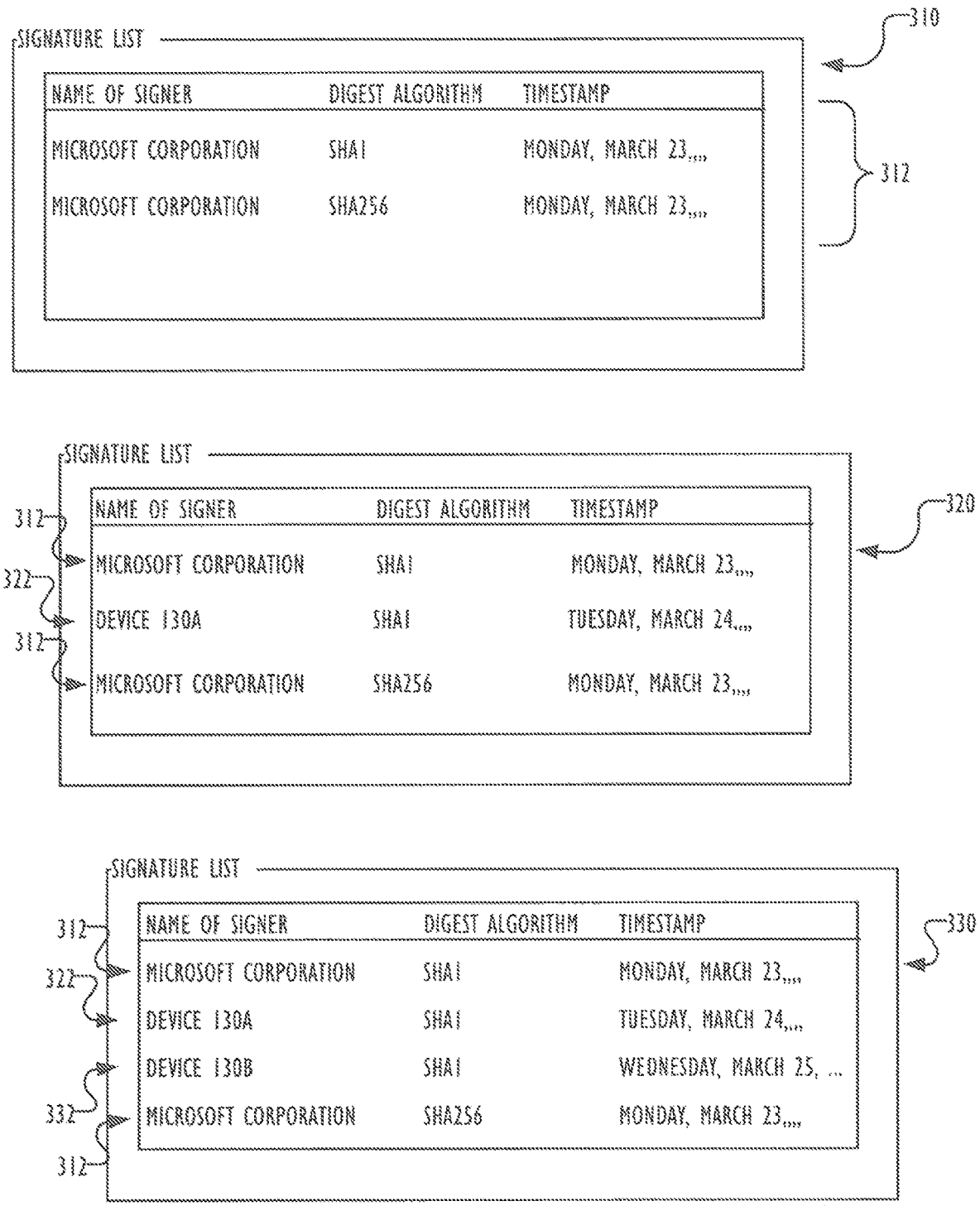
FIGS. 3 and 4 are block diagrams illustrating a technique for signing a file according to one embodiment.

FIG. 3 is a block diagram illustrating signature chaining according to one embodiment. The block diagram is not intended to represent the way in which signature information is stored in a file, but is intended to give a human-readable representation of certain signature information typically contained in a signed file. In this example, the underlying file is a signed file obtained from Microsoft Corporation, signing as the creator of the file. The file may be either an application, or a part thereof, or a data file. In this example a signature list 310 is embedded in the file using techniques known to the art for embedding signatures, such as storing the signature information as extended attributes of the file, which may or may not use file system extended attributes. Other techniques for embedding signatures in the file may be used as desired.

The signature list contains two Microsoft Corporation signatures 312, one prepared using the SHA1 (Secure Hash Algorithm 1) cryptographic hash function that produces a 160 bit output, and the other prepared using the SHA256 cryptographic hash function that produces a 256 bit output. Each signature contains the name of the signer, the signing algorithm, and a timestamp of the signature, in FIG. 1 truncated to a partial date, but typically including both date and time information.

When an application or other file of interest is first seen on a device 130 (say, device 130A of FIG. 1), it is signed by the device 130A's TPM 132A using the key of the TPM 132A. The signing is chained signing, so that the original certificate is maintained. This creates signature list 320, which adds signature 322, indicating that the signature was created by device 130A using the SHAT algorithm. (Use of the SHA 1 algorithm is illustrative and by way of example only and other signing or message digest algorithms may be used as desired.) Signature 322 is therefore unique to device 130A. As shown by FIG. 3, the Microsoft Corporation signatures 312 are still present. This may happen when the application corresponding to this signature list is installed on the device 130A, for example.

The file then moves, via installation, copying, or other means, to device 130B and is signed by that device 130B in the TPM 132B using the key of the TPM 132B, producing a signature list 330 that includes both Microsoft Corporation signatures 312, as well as device 130A's signature 322 and device 130B's signature 332. Thus, the copy of the file on device 130B contains a signature list that can be analyzed to learn that the file originated from Microsoft Corporation and passed through device 130A before being found at device 130B.

Figure 4:
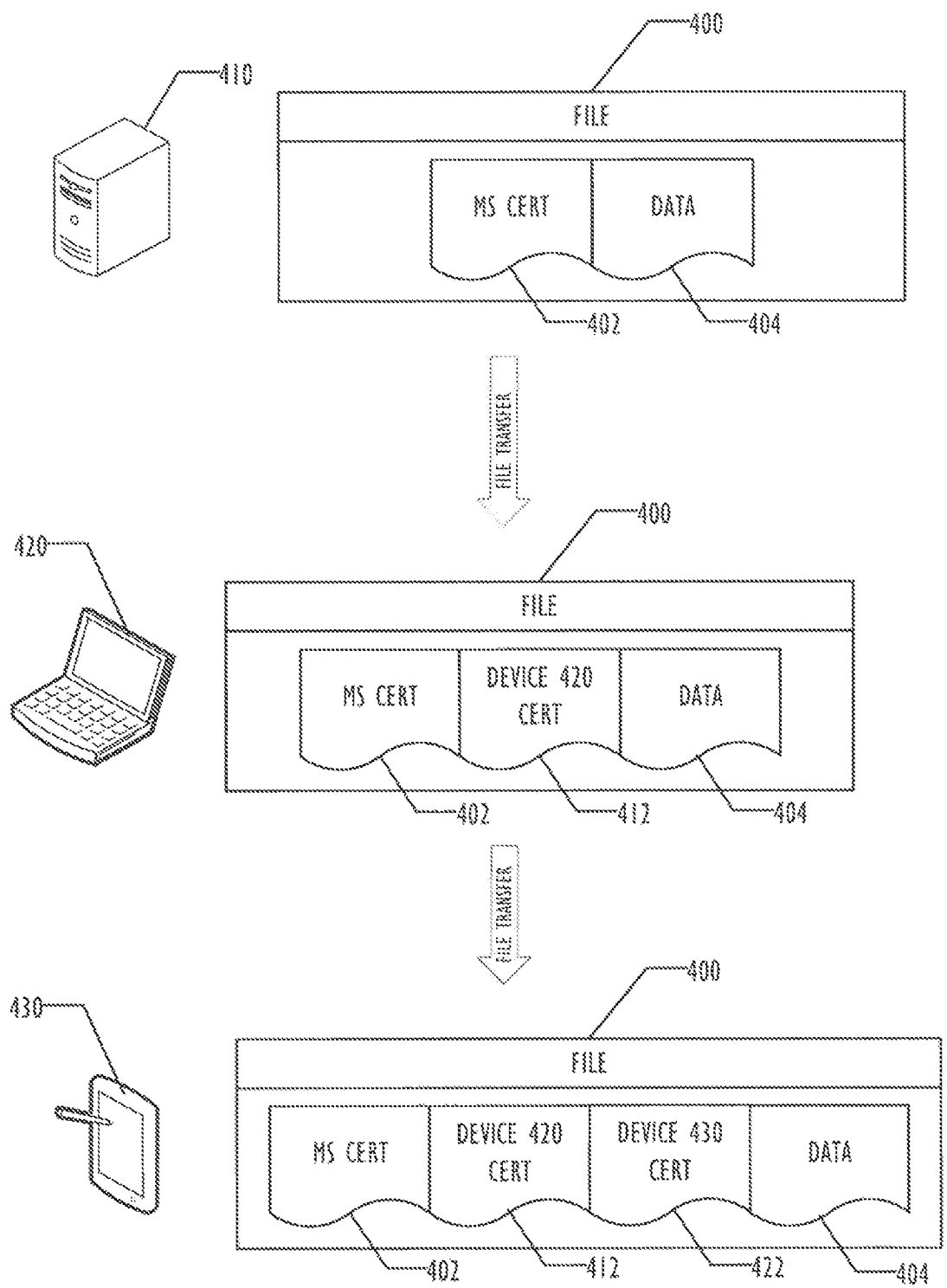

FIG. 4 is a block diagram pictorially illustrating a signature list as disclosed herein according to one embodiment. In this example, file 400 on server 410 has embedded a Microsoft Corporation certificate 402 in addition to the data 404. The file 400 is then transferred to a laptop computer 420 using some file transfer technique known to the art. Upon receipt by laptop 420, the TPM 132 of that laptop adds a device 420 certificate 412 to the file 400, preserving the Microsoft certificate 402 and the data 404. The file 400 is then transferred to a tablet device 430, which adds its own certificate 422 to the file 400, providing a chain back to the entry point into the enterprise or the first device 130 instrumented to perform certificate chaining as described herein. As many transfers and additional signing certificates can be added as needed. As FIG. 4 illustrates, the chained signing technique can be employed across different types of devices. Although the examples of FIG. 3 and FIG. 4 illustrates files that have creator signatures from Microsoft Corporation, files that are unsigned by their creator may also be chain signed using the disclosed techniques as desired. In such a scenario, the first signing device 130 would be the first signature in the file 400, and although the chaining signature cannot, therefore, be used to track the file back to its creator in such a situation, the chaining signature would still allow tracking the spread of the file across the enterprise.

Figure 5:
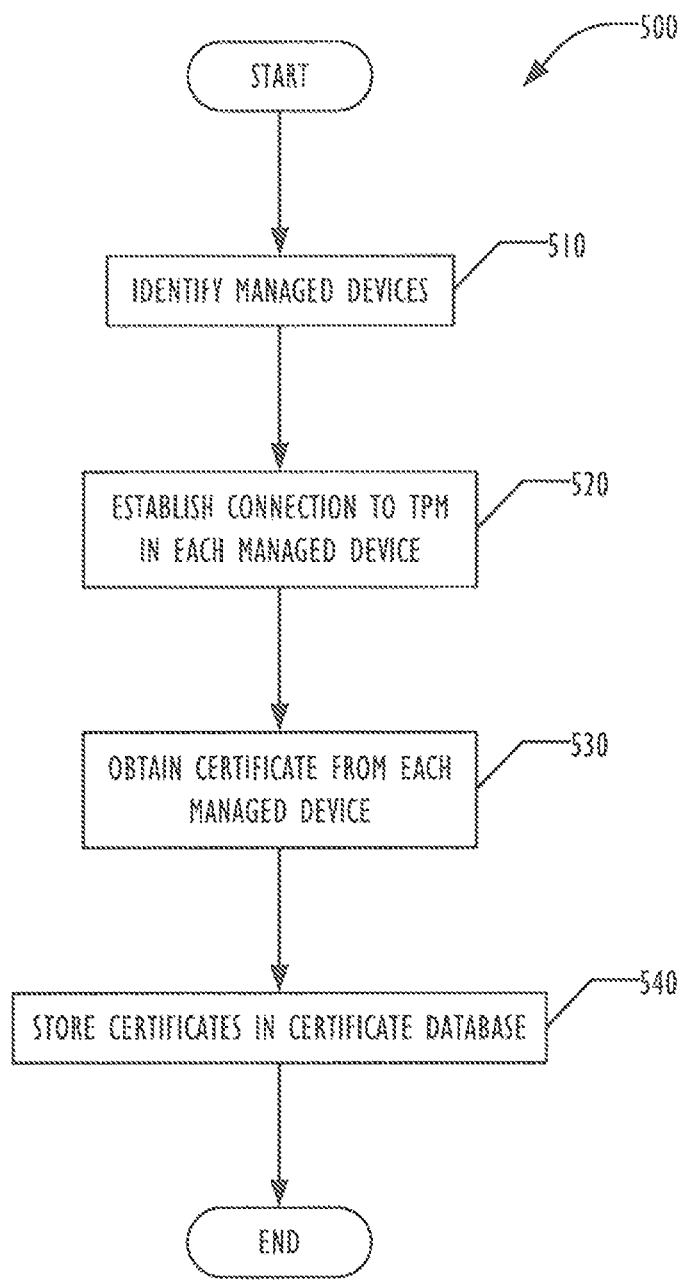
FIG. 5 is a flowchart illustrating collecting device certificate from managed devices by a management console according to one embodiment.

FIG. 5 is a flowchart illustrating a technique 500 for a management console 110 to collect information regarding managed devices 130 according to one embodiment. In block 510, the management console 110 may identify the devices 130 to be managed. This may be done using any identification technique known to the art, including active probes broadcast from the management console 110 and passive reception of identification information sent by devices 130 as they connect to a network. The content of the information used to identify the managed devices 130 is not significant to this disclosure as long as the information can uniquely identify the managed device 130; however, typical information includes a name and an Internet Protocol (IP) address for the managed device 130. In block 520, the management console 110 establishes a connection via the intervening network or networks to the TPM 132 of each managed device 130. The management console 110 in block 530 then obtains a copy of the device certificate from each managed device 130. The received certificates may then be stored in the certificate database 120 in block 540 for later use. The connection to the TPMs 132 does not need to be maintained once the device certificate is obtained from the TPM 132, but may be terminated or maintained as desired. Although described as a database, the certificate database 120 may be implemented using any desired storage technique, including text files and structured databases of any type. The certificate data stored in the certificate database 120 may be stored using any tables or other arrangements of data as desired.

The management console 110 may interact with managed devices 130 for other purposes as desired.

Figure 6:
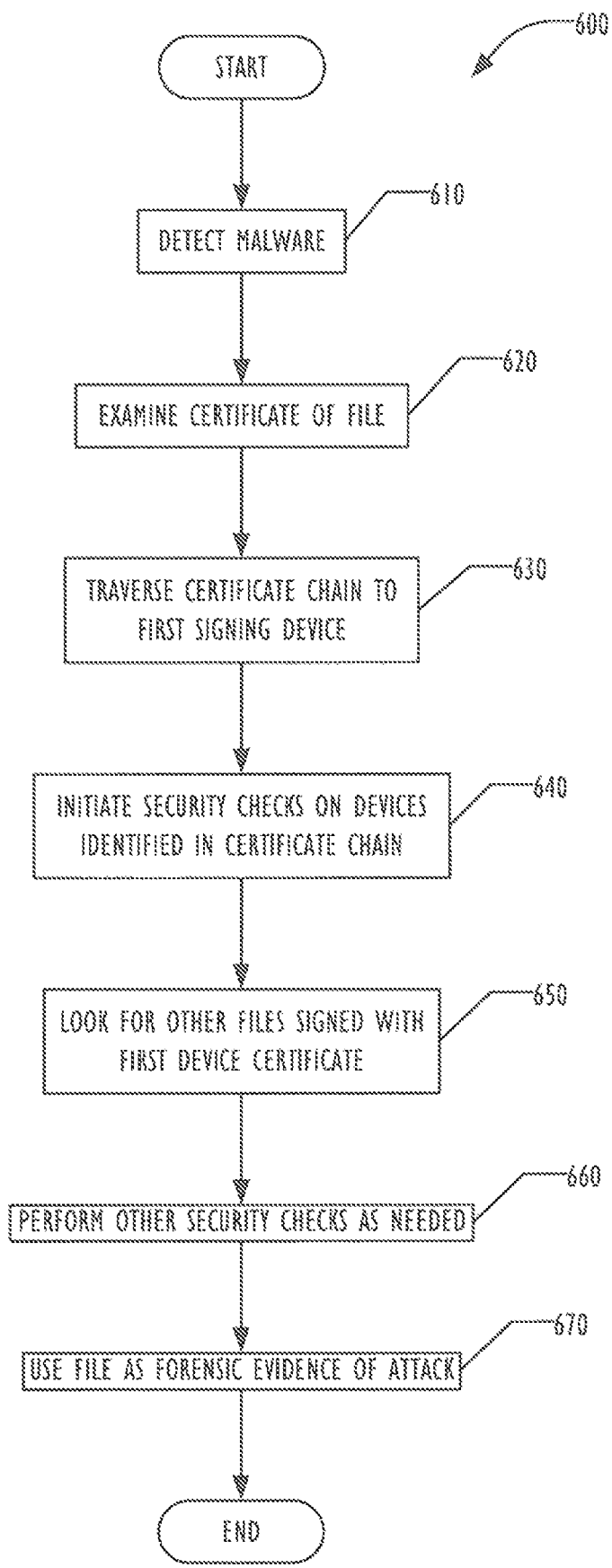
FIG. 6 is a flow chart illustrating a technique for traversing a chain is signatures of a a file according to one embodiment.

Turning now to FIG. 6, a flowchart 600 illustrates a technique for determining how a file infected with malware has spread across an enterprise or other groups of managed devices 130 that are managed by the management console 110. For purposes of this disclosure, the technique is described as being performed by the management console 110. However, in some embodiments, the technique may be performed on one or more of the managed devices 130 or another device not illustrated in FIG. 1. Portions of the technique may be performed by different devices, as desired.

In block 610, malware is detected in a file. The detection technique is outside the scope of this disclosure, and any malware detection technique known to the art may be used. In some embodiments, detection of malware triggers sending the certificate data associated with the file to the management console 110. Other embodiments may send the entire file to the management console 110. Some embodiments may send additional data with the certificate data or file. The certificate data associated with the file is then examined in block 620. If multiple certificates are found with the infected file, then in block 630 the chain of signatures may be traversed, identifying the managed devices 130 that have signed the file, and identifying the first signing managed device 130. The TPM certificates stored in the certificate database 120 are used to obtain the public key for their respective managed device 130 to allow examination of each certificate in the signature list. If a certificate has been tampered with, the management console can determine that fact. While such tampering may destroy the ability to traverse the signature list back to the first signing device, the collection of managed devices 130 that received the file after that tampering can be tracked using this technique. If the certificates are valid, the first signing device 130 may be determined by traversing the certificate chain.

In block 640, the management console 110 may initiate security checks on the managed devices 130 found in the certificate chain. This may involve performing malware scans on the managed devices 130, as well as other security checks that may be desirable. Corrective action may also be performed on the managed devices 130 identified in the signature list to remove or quarantine malware that is found on those devices 130.

In block 650, the management console 110 or the first signing device 130, as determined by traversing the signature list, may examine files that are related to the file containing malware. In one embodiment, the related files are files that are signed with the same original certificate across all or some of the managed devices 130. Those managed device 130 and the related files may also be examined by performing additional security checks or corrective actions as needed or desired in block 660. The nature of the security checks or corrective actions may depend upon the type of malware identified in the file.

In addition to performing the security checks or corrective actions described above, in block 670 the infected file and its signature list may be preserved as forensic evidence, providing non-repudiatable evidence of the systems that copies of the file traversed from the original signing managed device 130 to the most recent signing managed device. In some scenarios, the original signing device 130 (other than the creator) may be the device 130 that introduced the infected file into the enterprise. In other scenarios, one of the intermediate devices 130 may be the device 130 on which the infection by malware occurred. The technique thus provides a way to track the spread of an infected file through an enterprise or other group of managed devices 130, without needing real-time access to the managed devices 130 as the spread occurs, but performing the spread analysis upon detection of the malware infection. Because the signature list is non-repudiatable, the management console 110 can provide solid forensic evidence to show that (for example) the infected file entered into the collection of managed devices at a specific location, allowing bring other security tools into play to examine that device 130 further.

Because all of the signatures are carried with each copy of the file as that copy is made and transferred, the traversal of the signature list to the original signer may be performed without access to the signing managed devices 130. This means that cooperation by users of those devices 130 is not required to locate the "patient 0" that first introduced the infection.

Figure 7:
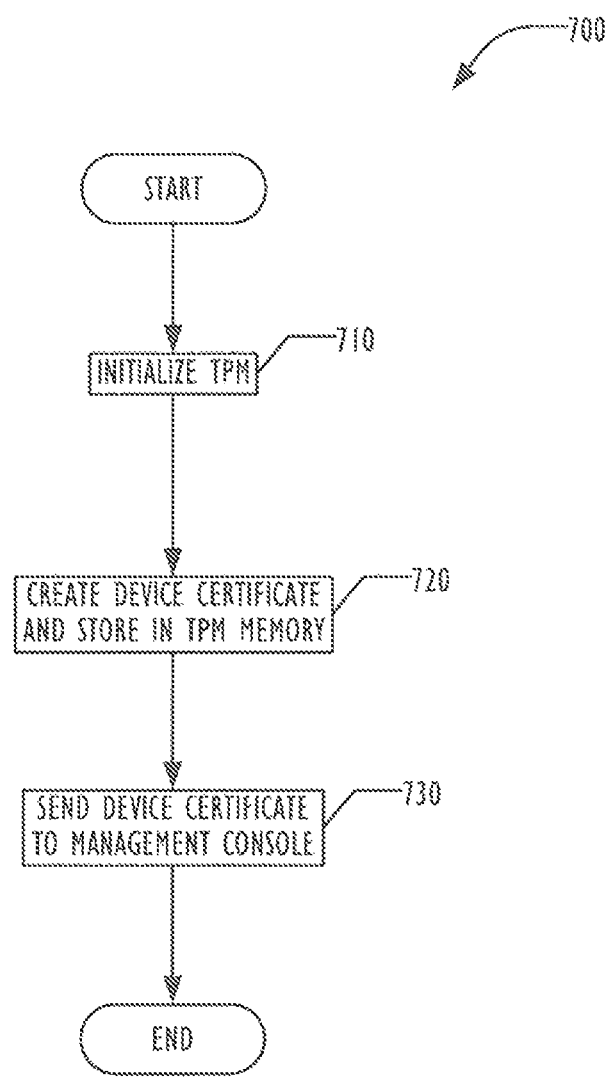
FIG. 7 is a flowchart illustrating a technique for generating and storing a device certificate by a TPM according to one embodiment.

FIG. 7 is a flowchart illustrating a technique 700 for creating the device certificates according to one embodiment. In block 710 the TPM 132 is initialized. This typically occurs when the device 130 is powered on, but embodiments may delay TPM initialization until later, such as after an operating system begins execution. In block 720, the TPM 132 creates a device certificate and stores the device certificate in TPM-controlled memory. The certificate will include the public key of the TPM 132. The TPM typically controls a memory region that is inaccessible to the operating system or applications running under the operating system, providing secure control over the TPM-controlled memory. Then in block 730 the TPM 132 sends the device certificate to the management console 110. Block 730 may be performed upon receipt of a request for the certificate received by the TPM 132 from the management console 110, or may send the device certificate unsolicited to the management console 110. In some embodiments, the certificate may be encrypted and provided to a processor of the managed device 130 for sending to the management console 110. In other embodiments, the TPM 132 may send the device certificate itself, bypassing the processor to ensure a secure transmission.

Figure 8:
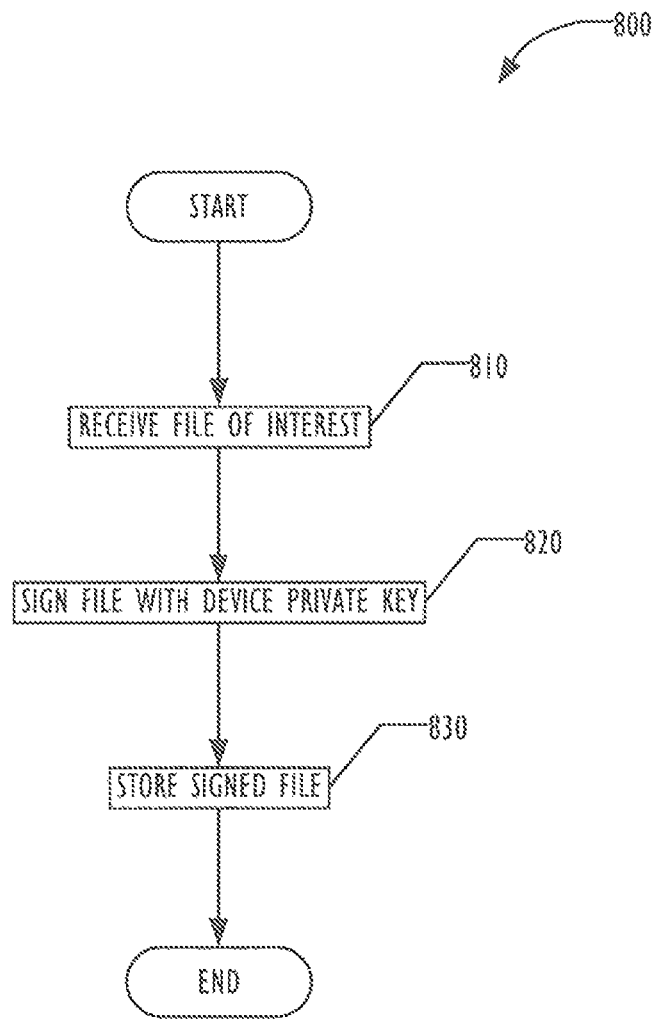
FIG. 8 is a flowchart illustrating a technique for signing a file according to one embodiment.

FIG. 8 is a flowchart 800 illustrating signing of a file of interest by a managed device 130 according to one embodiment. In block 810, the managed device 130 receives a file of interest or a file of interest is created, such as by receiving a file via a network or during installation of a software package on the managed device 130. In one embodiment, a whitelist may be maintained of files that should be signed and their spread or transfer monitored by the management console 110. In other embodiments, files of one or more predetermined file types, e.g., .exe and other executable files, may be signed, while files of other file types may be unsigned. Similarly, a management client software of the managed client device 130 may use whitelists and blacklists of files where the signature list should be checked. In other embodiments, every file may be signed upon receipt or creation.

In block 820, the file, such as the file 400, is signed by the TPM 132 of the managed device 130 with the private key of the TPM 132, creating a signing certificate. In one embodiment, the signing is performed on the data 404. In other embodiments, the signing is done on the data 404 and all signing certificates already in the file. So, for example, when signed by laptop 420, the signing may sign the data 404, as well as creator certificate 402 and certificate 412 that was created by server 410.

In block 830, the signed file may then be stored in a file system storage area of the managed device 130. Tampering with the signed file is be detectable because the signature of a tampered file does not match the file.

Figure 9:
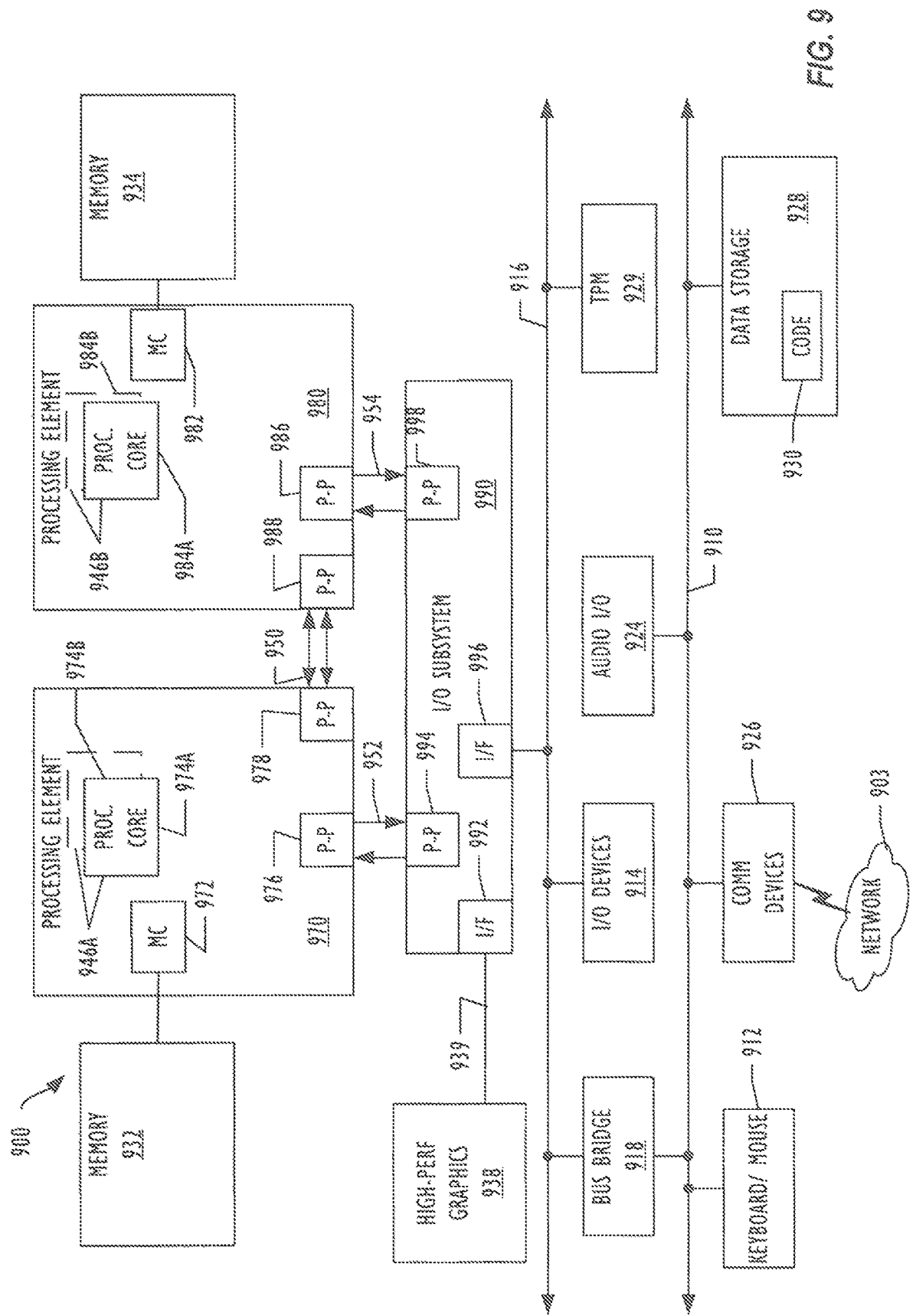
FIGS. 9 and 10 are block diagrams illustrating programmable devices that may be used for implementing management consoles and managed devices according to various embodiments.

Referring now to FIG. 9, a block diagram illustrates a programmable device 900 that may be used for either the management console 110 or the managed devices 130 in accordance with one embodiment. The programmable device illustrated in FIG. 9 is a multiprocessor programmable device 900 that includes a first processing element 970 and a second processing element 980. While two processing elements 970 and 980 are shown, an embodiment of programmable device 900 may also include only one such processing element.

Programmable device 900 is illustrated as a point-to-point interconnect system, in which the first processing element 970 and second processing element 980 are coupled via a point-to-point interconnect 950. Any or all of the interconnects illustrated in FIG. 9 may be implemented as multi-drop bus rather than point-to-point interconnects.

As illustrated in FIG. 9, each of processing elements 970 and 980 may be multicore processors, including first and second processor cores (i.e., processor cores 974a and 974b and processor cores 984a and 984b). Such cores 974a, 974b, 984a, 984b may be configured to execute instruction code in a manner similar to that discussed above in connection with FIGS. 1-4. However, other embodiments may use processing elements that are single core processors as desired. In embodiments with multiple processing elements 970, 980, each processing element may be implemented with different numbers of cores as desired.

Each processing element 970, 980 may include at least one shared cache 946. The shared cache 946a, 946b may store data (e.g., instructions) that are utilized by one or more components of the processing element, such as the cores 974a, 974b and 984a, 984b, respectively. For example, the shared cache may locally cache data stored in a memory 932, 934 for faster access by components of the processing elements 970, 980. In one or more embodiments, the shared cache 946a, 946b may include one or more mid-level caches, such as level 2 (L2), level 3 (L3), level 4 (L4), or other levels of cache, a last level cache (LLC), or combinations thereof.

While FIG. 9 illustrates a programmable device with two processing elements 970, 980 for clarity of the drawing, the scope of the present invention is not so limited and any number of processing elements may be present. Alternatively, one or more of processing elements 970, 980 may be an element other than a processor, such as an graphics processing unit (GPU), a digital signal processing (DSP) unit, a field programmable gate array, or any other programmable processing element. Processing element 980 may be heterogeneous or asymmetric to processing element 970. There may be a variety of differences between the processing elements 970, 980 in terms of a spectrum of metrics of merit including architectural, microarchitectural, thermal, power consumption characteristics, and the like. These differences may effectively manifest themselves as asymmetry and heterogeneity amongst the processing elements 970, 980. In some embodiments, the various processing elements 970, 980 may reside in the same die package.

First processing element 970 may further include memory controller logic (MC) 972 and point-to-point (P-P) interfaces 976 and 978. Similarly, second processing element 980 may include a MC 982 and P-P interfaces 986 and 988. As illustrated in FIG. 9, MCs 972 and 982 couple the processing elements 970, 980 to respective memories, namely a memory 932 and a memory 934, which may be portions of main memory locally attached to the respective processors. While MC logic 972 and 982 is illustrated as integrated into the processing elements 970, 980, in some embodiments the MC logic may be discrete logic outside the processing elements 970, 980 rather than integrated therein.

Processing element 970 and processing element 980 may be coupled to an I/O subsystem 990 via P-P interfaces 976 and 986 and P-P interconnects 952 and 954, respectively. As illustrated in FIG. 9, I/O subsystem 990 includes P-P interfaces 994 and 998. Furthermore, I/O subsystem 990 includes an interface 992 to couple I/O subsystem 990 with a high performance graphics engine 938. In one embodiment, bus 939 may be used to couple graphics engine 938 to I/O subsystem 990. Alternately, a point-to-point interconnect 939 may couple these components.

In turn, I/O subsystem 990 may be coupled to a first link 916 via an interface 996. In one embodiment, first link 916 may be a Peripheral Component Interconnect (PCI) bus, or a bus such as a PCI Express bus or another I/O interconnect bus, although the scope of the present invention is not so limited.

As illustrated in FIG. 9, various I/O devices 914 may be coupled to first link 916, along with a bridge 918 which may couple first link 916 to a second link 910. In one embodiment, second link 910 may be a low pin count (LPC) bus. Various devices may be coupled to second link 910 including, for example, a keyboard/mouse 912, communication device(s) 926 (which may in turn be in communication with the computer network 903), and a data storage unit 928 such as a disk drive or other mass storage device which may include code 930, in one embodiment. The code 930 may include instructions for performing embodiments of one or more of the techniques described above. Further, an audio I/O 924 may be coupled to second bus 910.

A TPM 929 may be coupled to the I/O subsystem 990 or elsewhere in the programmable device 900 for providing a trusted execution environment for certificate creation and signing. The TPM 929 typically is cryptographically controlled and restricts execution to only executable code signed with a cryptographic key. The TPM 929 may be implemented as a separate chip or chipset from the processing elements, or may be packaged as part of a chipset providing some or all of the elements illustrated in FIG. 9.

Note that other embodiments are contemplated. For example, instead of the point-to-point architecture of FIG. 9, a system may implement a multi-drop bus or another such communication topology. Although links 916 and 910 are illustrated as busses in FIG. 9, any desired type of link may be used. In addition, the elements of FIG. 9 may alternatively be partitioned using more or fewer integrated chips than illustrated in FIG. 9. For example, the components may be implemented as networked (LAN, enterprise network, Internet and/or distributed in the cloud) computing devices (real or virtual) or microcontrollers which jointly perform the 230 function.

Figure 10:
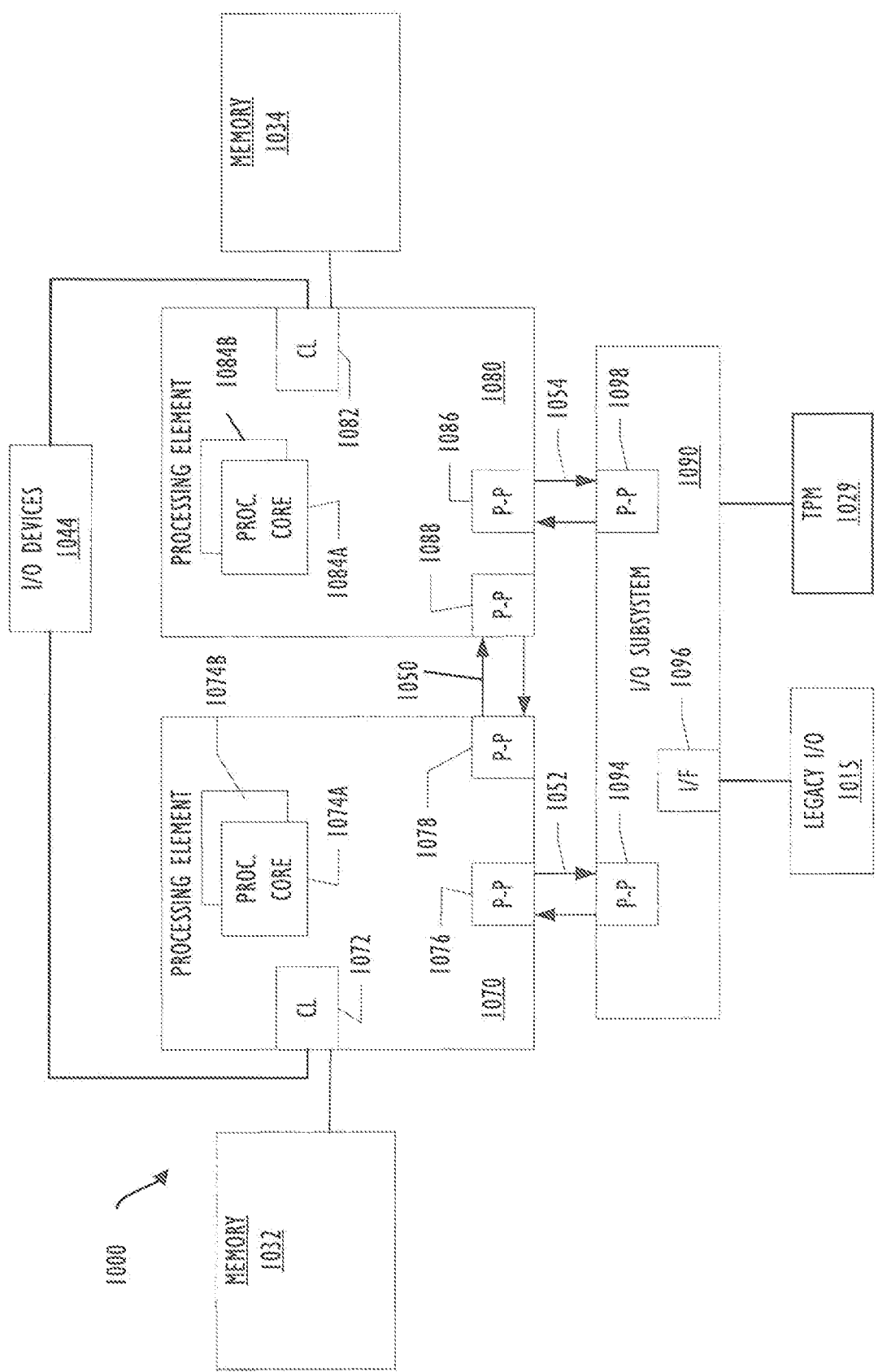

Referring now to FIG. 10, a block diagram illustrates a programmable device 1000 according to another embodiment. Certain aspects of FIG. 9 have been omitted from FIG. 10 in order to avoid obscuring other aspects of FIG. 10.

FIG. 10 illustrates that processing elements 1070, 1080 may include integrated memory and I/O control logic ("CL") 1072 and 1082, respectively. In some embodiments, the CL 1072, 1082 may include memory control logic (MC) such as that described above in connection with FIG. 9. In addition, CL 1072, 1082 may also include I/O control logic. FIG. 10 illustrates that not only may the memories 1032, 1034 be coupled to the CL 1072, 1082, but also that I/O devices 1044 may also be coupled to the control logic 1072, 1082. Legacy I/O devices 1015 may be coupled to the I/O subsystem 1090 by interface 1096. Each processing element 1070, 1080 may include multiple processor cores, illustrated in FIG. 10 as processor cores 1074A, 1074B, 1084A, and 1084B. As illustrated in FIG. 10, I/O subsystem 1090 includes P-P interfaces 1094 and 1098 that connect to P-P interfaces 1076 and 1086 of the processing elements 1070 and 1080 with interconnects 1052 and 1054. Processing elements 1070 and 1080 may also be interconnected by interconnect 1050 and interfaces 1078 and 1088, respectively.

As with the programmable device 900, the programmable device 1000 may contain a TPM 1029.

The programmable devices depicted in FIGS. 9 and 10 are schematic illustrations of embodiments of programmable devices that may be utilized to implement various embodiments discussed herein. Various components of the programmable devices depicted in FIGS. 9 and 10 may be combined in a system-on-a-chip (SoC) architecture.

In some embodiments, a management client software executing in the managed device 130 may provide a way to detect the creation of a file in a file system of the managed device 130, providing an opportunity to cause the TPM 132 to sign the file, typically using a kernel driver or file system filter to request the TPM 132 to do the signing.

In one embodiment, the timestamp of the certificate may be used to quickly find the oldest, and thus original, device that signed this file. By examining the signature list, a file that is licensed for a specific number of copies may be checked and an additional copy prohibited if the signature list shows the number of signatures meets the copy limitation. Leakage of data from a managed client may be detected and the locations that the data has been leaked determined from the signature list.

Although the description above has been written in terms of anti-malware processes, using the signature list to determine where an infected file originated, other uses for the chained file signing exist. For example, some embodiments may use chained file signing to detect unauthorized copying of copyright-protected works. Upon examining the certificate chain in a file, embodiments may determine that the file has been copied from each of the managed devices 130 in the file signature list. If that copying is unauthorized, the chain of certificates provides forensic evidence of such copying, as well as of the origin and path of the spread of that copy of the file.

The following examples pertain to further embodiments.

Example 1 is a machine readable medium, on which are stored instructions, comprising instructions that when executed cause a machine to: generate a device certificate in trusted environment of the machine; send the device certificate to a management console; detect creation of a file on the machine; sign the file using the device certificate in the trusted environment; and store the signed file on the machine.

In Example 2, the subject matter of Example 1 can optionally include wherein the instructions that when executed cause the machine to send the device certificate to a management console comprise instructions that when executed cause the machine to: establish a connection between the trusted environment and the management console; receive a request for the device certificate from the management console via the connection; and send the device certificate to the management console via the connection responsive to the request.

In Example 3, the subject matter of any of Examples 1-2 can optionally include wherein the instructions that when executed cause the machine to generate a device certificate in a trusted environment of the machine comprise instructions that when executed cause the machine to: generate the device certificate using a private key of the trusted environment.

In Example 4, the subject matter of any of Examples 1-2 can optionally include wherein the instructions that when executed cause the machine to detect creation of a file on the machine comprise instructions that when executed cause the machine to: identify the file in a list of files of interest.

In Example 5, the subject matter of any of Examples 1-2 can optionally include wherein the instructions further comprise instructions that when executed cause the machine to: perform security checks on the machine responsive to a request from the management console.

In Example 6, the subject matter of any of Examples 1-2 can optionally include wherein the instructions that when executed cause the machine to sign the file using the device certificate in the trusted environment comprise instructions that when executed cause the machine to: preserve a chain of certificates from other signing devices present in the file.

Example 7 is a machine readable medium, on which are stored instructions, comprising instructions that when executed cause the machine to: identify a plurality of managed devices; receive a device certificate from a trusted environment in each of the plurality of managed devices; store the device certificate in a certificate database; and evaluate a chain of signatures in a file of interest, the instructions comprising instructions that when executed cause the machine to: determine a set of managed devices of the plurality of managed devices where the file has been present using the chain of signatures and device certificates obtained from the certificate database; and identify an earliest managed device of the set of managed devices.

In Example 8, the subject matter of Example 7 can optionally include wherein the instructions further comprise instructions that when executed cause the machine to: initiate a security check on each managed device in the set of managed devices.

In Example 9, the subject matter of Example 7 can optionally include wherein the instructions further comprise instructions that when executed cause the machine to: initiate a security check on the earliest managed device of the set of managed devices.

In Example 10, the subject matter of any of Examples 7-9 can optionally include wherein the instructions further comprise instructions that when executed cause the machine to: preserve the file and chain of signatures as forensic evidence of a security incident.

Example 11 is a method of determining a source of infection in a plurality of managed devices, comprising: collecting device certificates from a trusted environment of each of the plurality of managed devices; storing the device certificate in a certificate database; analyze an infected file, comprising: retrieving certificates from the certificate database corresponding to certificates in a chain of certificates in the infected file; identifying a path of managed devices from a first managed device to a second managed device using the chain of certificates in the infected file; and performing security checks on the first managed device.

In Example 12, the subject matter of Example 11 can optionally include further comprising: preserving the infected file as forensic evidence of an attack.

In Example 13, the subject matter of any of Examples 11-12 can optionally include wherein retrieving certificates from the certificate database comprises: obtaining public keys associated with each retrieved certificate.

In Example 14, the subject matter of Example 13 can optionally include wherein collecting device certificates comprises: establishing a connection with a trusted environment of each of the plurality of managed devices; requesting a device certificate from the trusted environment of each of the plurality of managed devices; and receiving the device certificate via the connection responsive to the request.

Example 15 is a management console system, comprising: a processing element; a memory, coupled to the processing element, storing instructions that when executed cause the processing element to: collect a plurality of device certificates, each obtained from a trusted environment of a managed device of a plurality of managed devices; analyze a chain of signatures in a file, each signature signed with a private key of a managed device of the plurality of managed devices; validate each signature using a public key associated with a device certificate; and determine which managed devices of the plurality of managed devices have signed the file.

In Example 16, the subject matter of Example 15 can optionally include wherein the instructions further comprise instructions that when executed cause the processing element to: identify an earliest managed device of the plurality of managed devices that signed the file.

In Example 17, the subject matter of any of Examples 15-16 can optionally include wherein the instructions further comprise instructions that when executed cause the processing element to: store the plurality of device certificates in a certificate database.

In Example 18, the subject matter of any of Examples 15-16 can optionally include wherein the instructions further comprise instructions that when executed cause the processing element to: initiate a security action on at least some of the plurality of managed devices that signed the file.

In Example 19, the subject matter of any of Examples 15-16 can optionally include wherein the instructions further comprise instructions that when executed cause the processing element to: initiate a security action on an earliest managed device of the plurality of managed devices that signed the file.

In Example 20, the subject matter of Example 19 can optionally include wherein the instructions further comprise instructions that when executed cause the processing element to: search for other files signed with the device certificate of the earliest managed device on other managed devices of the plurality of managed devices; and perform a security action on the other managed devices.

Example 21 is a managed programmable device, comprising: a processing element; a trusted environment, coupled to the processing element; a memory, coupled to the trusted environment, on which are stored instructions that when executed cause the trusted environment to: provide a device certificate signed by a private key of the trusted environment to a management console device; receive information about a new file from the processing element; and sign the new file using the private key of the trusted environment.

In Example 22, the subject matter of Example 21 can optionally include where the instruction that when executed cause the trusted environment to provide a device certificate comprise instructions that when executed cause the trusted environment to: receive a request for the device certificate from a management console device; generate the device certificate signed by the private key of the trusted environment, responsive to the request; and send the device certificate to the management console device.

In Example 23, the subject matter of any of Examples 21-22 can optionally include wherein the instructions that when executed cause the trusted environment to sign the new file comprise instructions that when executed cause the trusted environment to: embed a certificate signed with the private key of the trusted environment in the new file.

In Example 24, the subject matter of any of Examples 21-22 can optionally include wherein the instructions that when executed cause the trusted environment to sign the new file comprise instructions that when executed cause the trusted environment to: store a certificate signed with the private key of the trusted environment as an extended attribute of the new file.

In Example 25, the subject matter of any of Examples 21-22 can optionally include further comprising: a memory, coupled to the processing element, on which are stored instructions that when executed cause the processing element to: notify the trusted environment of the new file; and store the signed new file in a file system associated with the managed programmable device.

Example 26 is a programmable device, comprising: a processor; a trusted environment, coupled to the processor; a memory, coupled to the processor, on which are stored instructions, comprising instructions that when executed cause the processor to: generate a device certificate in the trusted environment; send the device certificate to a management console; detect creation of a file on the machine; sign the file using the device certificate in the trusted environment; and store the signed file.

In Example 27, the subject matter of Example 26 can optionally include wherein the instructions that when executed cause the processor to send the device certificate to a management console comprise instructions that when executed cause the processor to: establish a connection between the trusted environment and the management console; receive a request for the device certificate from the management console via the connection; and send the device certificate to the management console via the connection responsive to the request.

In Example 28, the subject matter of any of Examples 26-27 can optionally include wherein the instructions that when executed cause the processor to detect creation of a file on the processor comprise instructions that when executed cause the processor to: identify the file in a list of files of interest.

In Example 30, the subject matter of any of Examples 26-27 can optionally include wherein the instructions further comprise instructions that when executed cause the processor to: perform security checks on the processor responsive to a request from the management console.

In Example 31, the subject matter of Example 32 can optionally include wherein the instructions further comprise instructions that when executed cause the processor to: initiate a security check on each managed device in the set of managed devices.

In Example 34, the subject matter of Example 32 can optionally include wherein the instructions further comprise instructions that when executed cause the processor to: initiate a security check on the earliest managed device of the set of managed devices.

In Example 35, the subject matter of any of Examples 32-34 can optionally include wherein the instructions further comprise instructions that when executed cause the processor to: preserve the file and chain of signatures as forensic evidence of a security incident.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. At least one non-transitory machine readable medium comprising instructions that, when executed, cause a machine to at least:
   generate a first device certificate in a trusted environment on the machine;
   send the first device certificate to a management console, the management console to manage the machine using a chain of device certificates including the first device certificate;
   detect creation of a file on the machine;
   sign the file using the first device certificate in the trusted environment to update the chain of device certificates in the file, the chain of device certificates to be formed from device certificates for devices including the machine on which the file has been present and managed by the management console to determine an origin and a spread pattern of the file across the devices on which the file has been present to form forensic evidence for identification of a source of malware infection by the management console;
   store the signed file and associated chain of device certificates on the machine; and
   perform, initiated by the management console, a security check of the file at the machine using the forensic evidence, the security check to identify tampering with the file and to trigger, by the management console when tampering is identified, corrective action on one or more affected devices according to the spread pattern.

2. The at least one machine readable medium of claim 1, wherein the instructions, when executed, cause the machine to:
   establish a connection between the trusted environment and the management console;
   receive a request for the first device certificate from the management console via the connection; and
   send the first device certificate to the management console via the connection responsive to the request.

3. The at least one machine readable medium of claim 1, wherein the instructions, when executed, cause the machine to:
   generate the first device certificate using a private key of the trusted environment.

4. The at least one machine readable medium of claim 1, wherein the instructions, when executed, cause the machine to:
   identify the file in a list of files.

5. The at least one machine readable medium of claim 1, further including instructions that, when executed, cause the machine to:
perform security checks on the machine responsive to a request from the management console.

6. The at least one machine readable medium of claim 1, wherein the instructions, when executed, cause the machine to:
preserve the chain of device certificates from other signing devices present in the file.

7. At least one non-transitory machine readable medium comprising instructions that, when executed, cause the machine to at least:
identify a plurality of managed devices;
receive a device certificate created in a trusted environment on the plurality of managed devices;
store the device certificate in a certificate database; and
evaluate a chain of signatures in a file of interest, the chain of signatures formed from device certificates for the plurality of managed devices where the file has been present, to:
determine a set of managed devices of the plurality of managed devices where the file has been present using the chain of signatures and device certificates obtained from the certificate database;
identify an earliest managed device of the set of managed devices using the chain of signatures to determine an origin and a spread pattern of the file across the managed devices on which the file has been present;
form forensic evidence using the file and the chain of signatures to identify a source of malware infection; and
perform a security check of the file at the machine using the forensic evidence, the security check to identify tampering with the file and to trigger, when tampering is identified, corrective action on one or more affected devices according to the spread pattern.

8. The at least one machine readable medium of claim 7, further including instructions that, when executed, cause the machine to:
initiate a security check on managed devices in the set of managed devices.

9. The at least one machine readable medium of claim 7, further including instructions that, when executed, cause the machine to:
initiate a security check on the earliest managed device of the set of managed devices.

10. The at least one machine readable medium of claim 7, further including instructions that, when executed, cause the machine to:
preserve the file and chain of signatures as forensic evidence of a security incident.

11. A method of determining a source of infection in a plurality of managed devices, comprising:
collecting, via a management console, device certificates created in a trusted environment on the plurality of managed devices;
storing the device certificate in a certificate database associated with the management console, the management console to manage the plurality of managed devices using the certificate database;
analyzing an infected file by at least:
retrieving certificates from the certificate database corresponding to certificates in a chain of certificates in the infected file, the chain of certificates formed from device certificates for the managed devices on which the infected file has been present;
identifying a path of managed devices from a first managed device to a second managed device using the chain of certificates in the infected file to determine an origin and a spread pattern of the infected file across the managed devices on which the file has been present, the infected file and the chain of certificates forming forensic evidence to identify a source of infection; and
performing security checks on the first managed device using the forensic evidence,
the security checks to identify tampering with the infected file and to trigger, when tampering is identified, corrective action by the management console on one or more affected devices according to the spread pattern.

12. The method of claim 11, further including:
preserving the infected file as forensic evidence of an attack.

13. The method of claim 11, wherein retrieving certificates from the certificate database includes:
obtaining public keys associated with the retrieved certificates.

14. The method of claim 13, wherein collecting device certificates includes:
establishing a connection with a trusted environment on the plurality of managed devices;
requesting a device certificate from the trusted environment on the plurality of managed devices; and
receiving the device certificate via the connection responsive to the request.

15. A management console system, comprising:
a processing element;
a memory, coupled to the processing element, including instructions that, when executed, cause the processing element to:
collect a plurality of device certificates created in a trusted environment on a plurality of managed devices, the device certificates created in the trusted environment on the managed device associated with the respective device certificate;
analyze a chain of signatures in a file, signatures in the chain of signatures signed with a private key of a respective managed device of the plurality of managed devices;
validate the signatures using a public key associated with a respective device certificate of the plurality of device certificates;
form forensic evidence using the file and the chain of signatures to identify a source of malware infection;
determine which managed devices of the plurality of managed devices have signed the file by analyzing the chain of signatures in the file to determine an origin and a spread pattern of the file across the devices on which the file has been present to identify the source of malware infection; and
perform a security check of the file using the forensic evidence, the security check to identify tampering with the file and to trigger, when tampering is identified, corrective action on one or more affected devices according to the spread pattern.

16. The management console system of claim 15, wherein the processing element is to:
identify an earliest managed device of the plurality of managed devices that signed the file.

17. The management console system of claim 15, wherein the processing element is to:
store the plurality of device certificates in a certificate database.

18. The management console system of claim 15, wherein the processing element is to:
initiate a security action on at least some of the plurality of managed devices that signed the file.

19. The management console system of claim 15, wherein the processing element is to:
initiate a security action on an earliest managed device of the plurality of managed devices that signed the file.

20. The management console system of claim 19, wherein the processing element is to:
search for other files signed with the device certificate of the earliest managed device on other managed devices of the plurality of managed devices; and
perform a security action on the other managed devices.

21. A managed programmable device, comprising:
a processing element;
a trusted environment, coupled to the processing element;
a memory, coupled to the trusted environment, including instructions that, when executed, cause the trusted environment to:
generate, in the trusted environment on the managed programmable device, a device certificate signed by a private key of the trusted environment to provide to a management console device, the management console device to manage the managed programmable device using a chain of device certificates including the device certificate;
receive information about a new file from the processing element;
sign the new file using the private key of the trusted environment to update the chain of device certificates in the file, the chain of device certificates to be formed from device certificates for devices on which the file has been present and managed by the management console device to determine an origin and a spread pattern of the file across the devices on which the file has been present, the chain of device certificates to form forensic evidence using the file and the chain of device certificates to identify a source of malware infection; and
perform, initiated by the management console, a security check of the file using the forensic evidence,
the security check to identify tampering with the file and to trigger, when tampering is identified, corrective action by the management console device on one or more affected devices according to the spread pattern.

22. The managed programmable device of claim 21, further including instructions that, when executed, cause the trusted environment to:
receive a request for the device certificate from a management console device;
generate the device certificate signed by the private key of the trusted environment, responsive to the request; and
send the device certificate to the management console device.

23. The managed programmable device of claim 21, wherein the instructions, when executed, cause the trusted environment to:
embed the device certificate signed with the private key of the trusted environment in the new file.

24. The managed programmable device of claim 21, wherein the instructions, when executed, cause the trusted environment to:
store the device certificate signed with the private key of the trusted environment as an extended attribute of the new file.

25. The managed programmable device of claim 21, further including instructions that, when executed, cause the processing element to:
notify the trusted environment of the new file; and
store the signed new file in a file system associated with the managed programmable device.

* * * * *